(12) United States Patent
Pasquero et al.

(10) Patent No.: US 8,749,531 B2
(45) Date of Patent: Jun. 10, 2014

(54) METHOD FOR RECEIVING INPUT ON AN ELECTRONIC DEVICE AND OUTPUTTING CHARACTERS BASED ON SOUND STROKE PATTERNS

(75) Inventors: Jerome Pasquero, Waterloo (CA); Jason Tyler Griffin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 917 days.

(21) Appl. No.: 12/750,770

(22) Filed: Mar. 31, 2010

(65) Prior Publication Data

US 2011/0242059 A1    Oct. 6, 2011

(51) Int. Cl.
G06F 3/043    (2006.01)
G06F 3/033    (2013.01)

(52) U.S. Cl.
USPC .......................................... 345/177; 345/179

(58) Field of Classification Search
USPC .......... 345/158, 172–179, 580, 860; 382/122, 382/186, 187, 188, 314; 715/541, 540
See application file for complete search history.

(56) References Cited

U.S. PATENT DOCUMENTS

| | | | |
|---|---|---|---|
| 4,718,102 A | 1/1988 | Crane et al. | |
| 6,205,261 B1* | 3/2001 | Goldberg | 382/310 |
| 2002/0009227 A1* | 1/2002 | Goldberg et al. | 382/181 |
| 2002/0190963 A1* | 12/2002 | Van Dam et al. | 345/173 |
| 2004/0047505 A1* | 3/2004 | Ghassabian | 382/186 |
| 2005/0270183 A1 | 12/2005 | Fux et al. | |
| 2006/0210163 A1* | 9/2006 | Garside et al. | 382/186 |
| 2009/0295758 A1* | 12/2009 | Lee et al. | 345/177 |

OTHER PUBLICATIONS

Harrison, Chris and Scott E. Hudson, "Scratch Input: Creating Large, Inexpensive, Unpowered and Mobile Finger Input Surfaces", UIST—ACM Symposium on User Interface Software and Technology (Oct. 2008).
Kim, J., Sunwoo, J., Son, Y., Lee, D., Lee, D., and Cho, I. A gestural input through finger writing on a textured pad. In Proceedings of CHI '07 Ext. Abstracts, pp. 2495-2500 (2007).
Halajian, Gary and John Wang "Gesture Recognition Based on Scratch Inputs", Cornell University (Apr. 26, 2009), 26 pages, online: Cornell University, http://instruct1.cit.cornell.edu/courses/ee476/FinalProjects/s2009/gh96_jbw48/gh96_jbw48/index.html.
Thread Topic: "Scratch Input: Very Cool!", M for Mature Forums, Post #7—Author: thebeastyboy15 (Aug. 9, 2009), 7 pages, online: M for Mature Forums http://forums.mformature.net/showthread.php?t=5198.
Canadian Office Action; CA application No. 2,735,871; May 15, 2013.

* cited by examiner

*Primary Examiner* — Alexander S Beck
*Assistant Examiner* — Tony N Ngo
(74) *Attorney, Agent, or Firm* — Ridout & Maybee LLP

(57) ABSTRACT

A method and electronic device for receiving input and outputting characters based on sound stroke patterns are described. In accordance with one embodiment, there is provided a method for receiving input on an electronic device, comprising: detecting sounds generated by characters written on a writing surface; identifying strokes defining the characters from the detected sounds in accordance with a number of predefined sound signatures, wherein each character written on the writing surface is defined by a stroke sequence comprising at least one stroke; determining at least one character which matches the at least one stroke in each stroke sequence; and outputting a string comprising the at least one character which matches the at least one stroke in each stroke sequence.

22 Claims, 9 Drawing Sheets

| Sequence of strokes S: Straight stroke; C: Curved stroke | S | SS | SSS | SSSS | C | CC | SC | CS | SCC | SCS | SSC |
|---|---|---|---|---|---|---|---|---|---|---|---|
| Corresponding Letters | I | L T V X Y | A F H K N Z | E M W | C O U | S | D P | G Q | B | R | J |

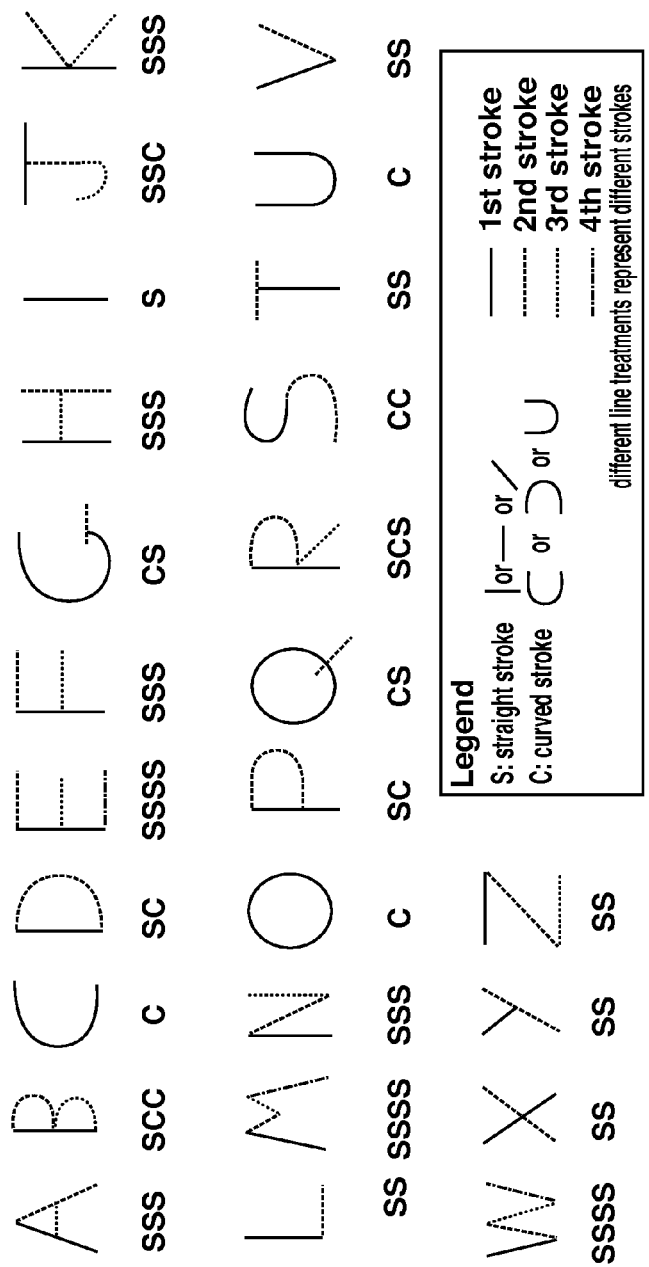

| Sequence of strokes S: Straight stroke; C: Curved stroke | S | CSS | SSC | SSS | SSC | C | SS | CC | C |
|---|---|---|---|---|---|---|---|---|---|
| Corresponding Digits | 1 | 2 | 3 5 | 4 | | 6 0 | 7 | 8 | 9 |

METHOD FOR RECEIVING INPUT ON AN ELECTRONIC DEVICE AND OUTPUTTING CHARACTERS BASED ON SOUND STROKE PATTERNS

TECHNICAL FIELD

The present disclosure relates to electronic devices, and in particular to a method and electronic device for receiving input and outputting characters based on sound stroke patterns.

BACKGROUND

Conventional methods for generating characters on an electronic device involve a physical keyboard or keypad, a virtual keyboard or keypad on a touchscreen, the combination of pen/stylus or finger input on a touch pad with handwriting recognition software, the combination of a camera system with optical character recognition (OCR) software, or the combination of speech input with a speech recognition software. While effective, alternative methods of generating characters are desired to make the process more flexible depending on the device environment and user needs, among other reasons.

BRIEF DESCRIPTION OF THE DRAWINGS

FIG. 4 is a diagrammatic representation of upper case letters using straight and curved strokes in accordance with one example embodiment of the present disclosure;

FIG. 5 is a chart illustrating predetermined character mappings for upper case letters in accordance with one example embodiment of the present disclosure;

DETAILED DESCRIPTION OF EXAMPLE EMBODIMENTS

Figure 1:
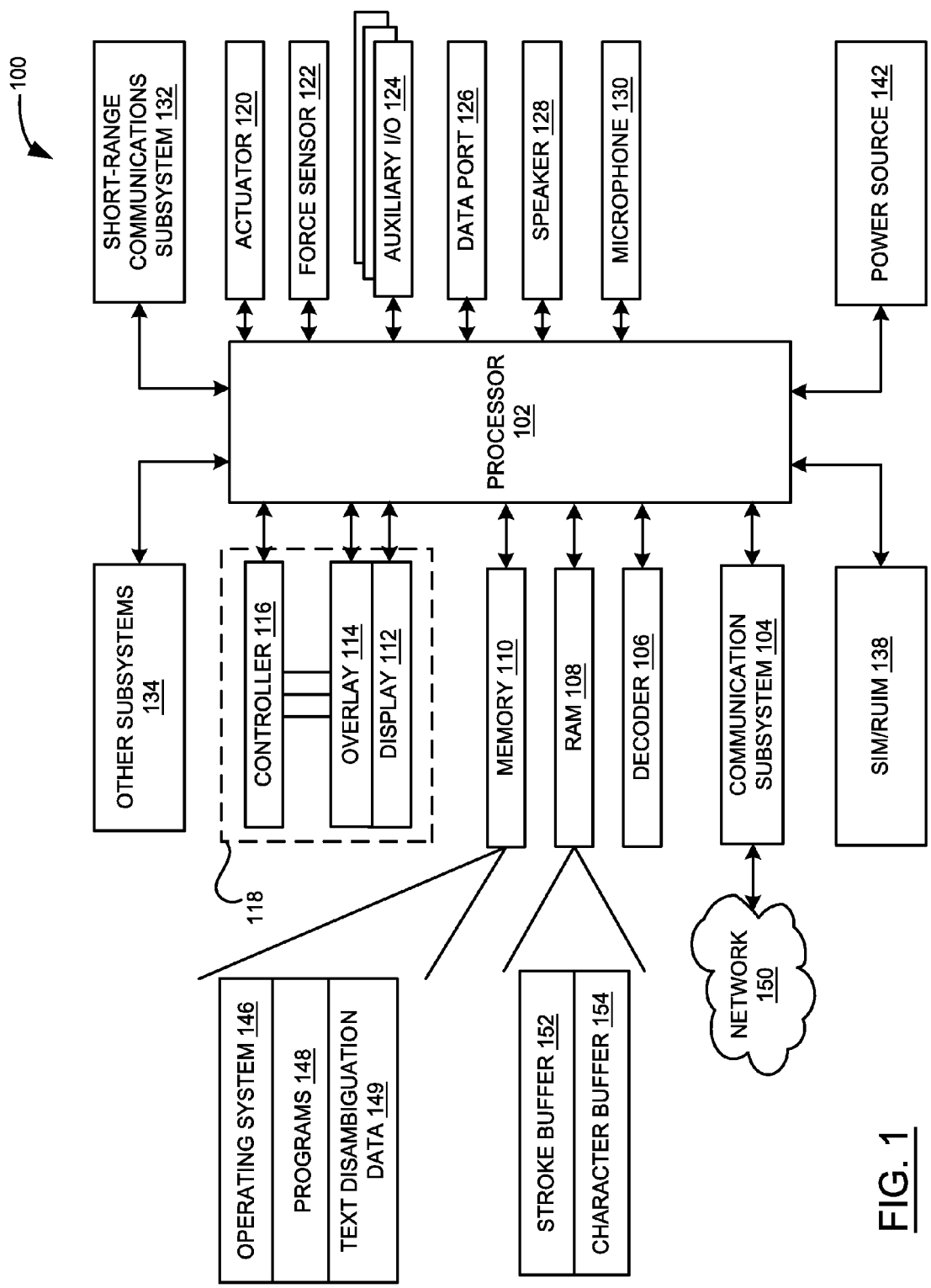
FIG. 1 is a simplified block diagram of components of a portable electronic device in accordance with one example embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure provides a method and electronic device for receiving input and outputting characters based on sound. This may be useful for all types of users, but more particularly those who are visually impaired as it does not require interaction with a keyboard or other fixed user input device. A conventional microphone is used in combination with text disambiguation software to output characters on the electronic device. The sounds of strokes generated by writing characters on a surface (e.g., a table, cover plate for accessing an internal compartment of the portable electronic device such as a battery compartment, or a special textured surface) are picked up by the microphone and processed by a stroke recognition function that outputs one or more possible characters for that sound. These candidates are then sent to a text disambiguation function (also known as a predictive text entry function) which then selects a string (e.g., word) which matches the sound. The strokes may be made using a finger, fingernail, pen, stylus or other suitable instrument.

In accordance with one embodiment of the present disclosure, there is provided a method for receiving input on an electronic device, comprising: detecting sounds generated by characters written on a writing surface; identifying strokes defining the characters from the detected sounds in accordance with a number of predefined sound signatures; determining at least one character which matches the identified strokes; and outputting a string comprising the at least one character which matches the identified strokes.

In accordance with another embodiment of the present disclosure, there is provided a method for receiving input on an electronic device, comprising: detecting sounds generated by characters written on a writing surface; identifying strokes defining the characters from the detected sounds in accordance with a number of predefined sound signatures, wherein each character written on the writing surface is defined by a stroke sequence comprising at least one stroke; determining at least one character which matches the at least one stroke in each stroke sequence; and outputting a string comprising the at least one character which matches the at least one stroke in each stroke sequence.

In accordance with a further embodiment of the present disclosure, there is provided an electronic device, comprising: a processor; a microphone connected to the processor; wherein the processor is configured for: detecting sounds generated by characters written on a writing surface using the microphone; identifying strokes defining the characters from the detected sounds in accordance with a number of predefined sound signatures, wherein each character written on the writing surface is defined by a stroke sequence comprising at least one stroke; determining at least one character which matches the at least one stroke in each stroke sequence; and outputting a string comprising the at least one character which matches the at least one stroke in each stroke sequence.

In accordance with yet a further embodiment of the present disclosure, there is provided a writing instrument, comprising: a stylus having an elongate body with opposed ends one of which defines a tip, wherein the tip has a textured surface configured to generate audible sounds when held in contact engagement with and moved across a surface, wherein the textured surface of the tip is configured to generate distinct audible sounds in response to each of a number of predetermined directions of movement. The writing instrument may further comprise: a microphone located towards the tip of the body.

In accordance with yet a further embodiment of the present disclosure, there is provided a texturized pad, comprising: a pad having a textured surface; a microphone located in the pad; and an electrical connector extending through the pad, the electrical connector being connected to the microphone and having an interface exposed by the pad and configured for a microphone input port.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

The present description of example embodiments does not limit implementation to any particular computer programming language or system architecture. Embodiments described in the specification are not limited to any particular operating system (OS), mobile device architecture, server architecture, or computer programming language.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communications subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

Figure 1A:
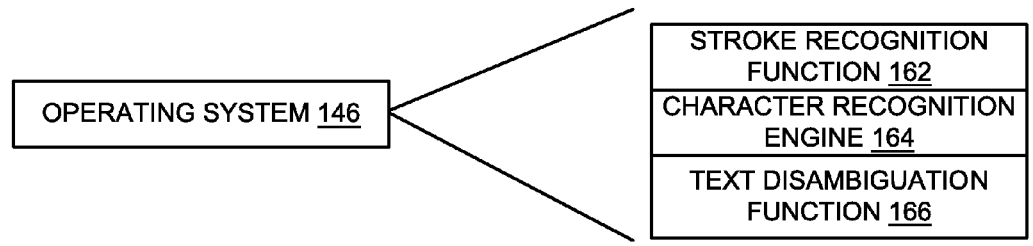
FIG. 1A is a schematic diagram showing select applications or routines of the portable electronic device of FIG. 1.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132 or any other suitable subsystem 134. In the shown embodiment, the operating system 146 includes a stroke recognition function 162, character recognition engine 164, and text disambiguation function 166 as shown in FIG. 1A. In other embodiments, these may each be part of a separate routine or program 148 or may be part of a common routine or program 148.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
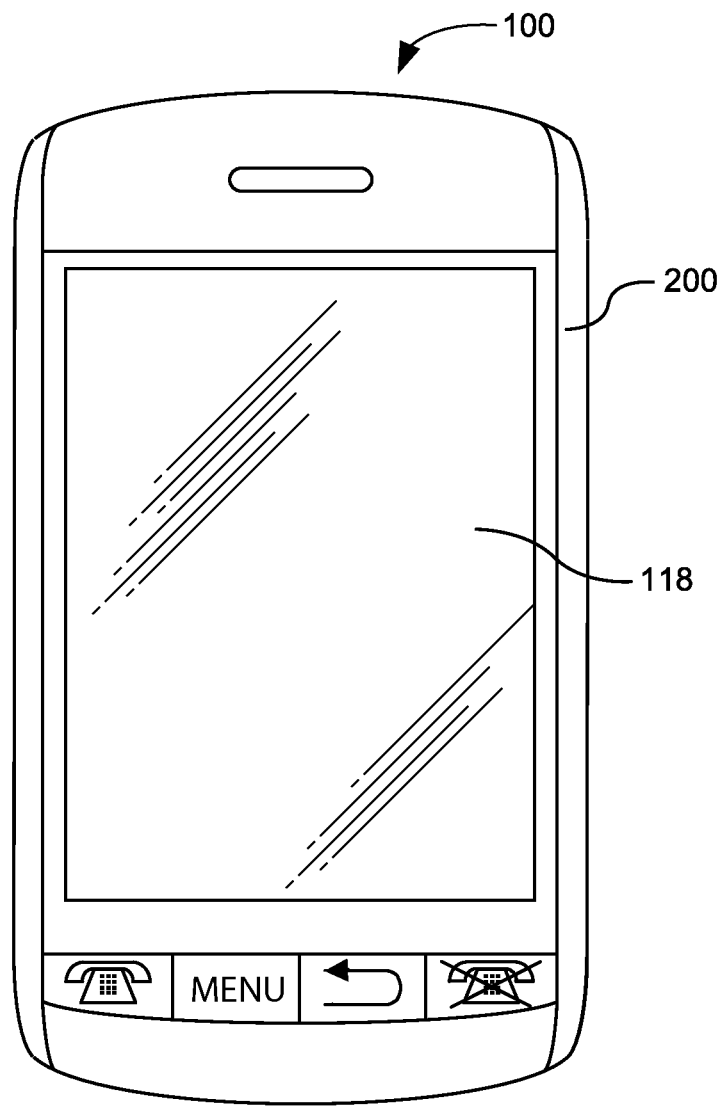
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected. The centre of the area of contact of each touch is commonly referred to as the touch point or centroid. It will be appreciated that during a touch event the touch point moves as the object detected by the touch-sensitive display 118 moves.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

In yet other embodiments, a conventional display screen may be provided instead of the touch-sensitive display 118. In such embodiments, input may be provided via one or more control keys, a keyboard or keypad, navigation device, or any combination thereof.

Figure 3A:
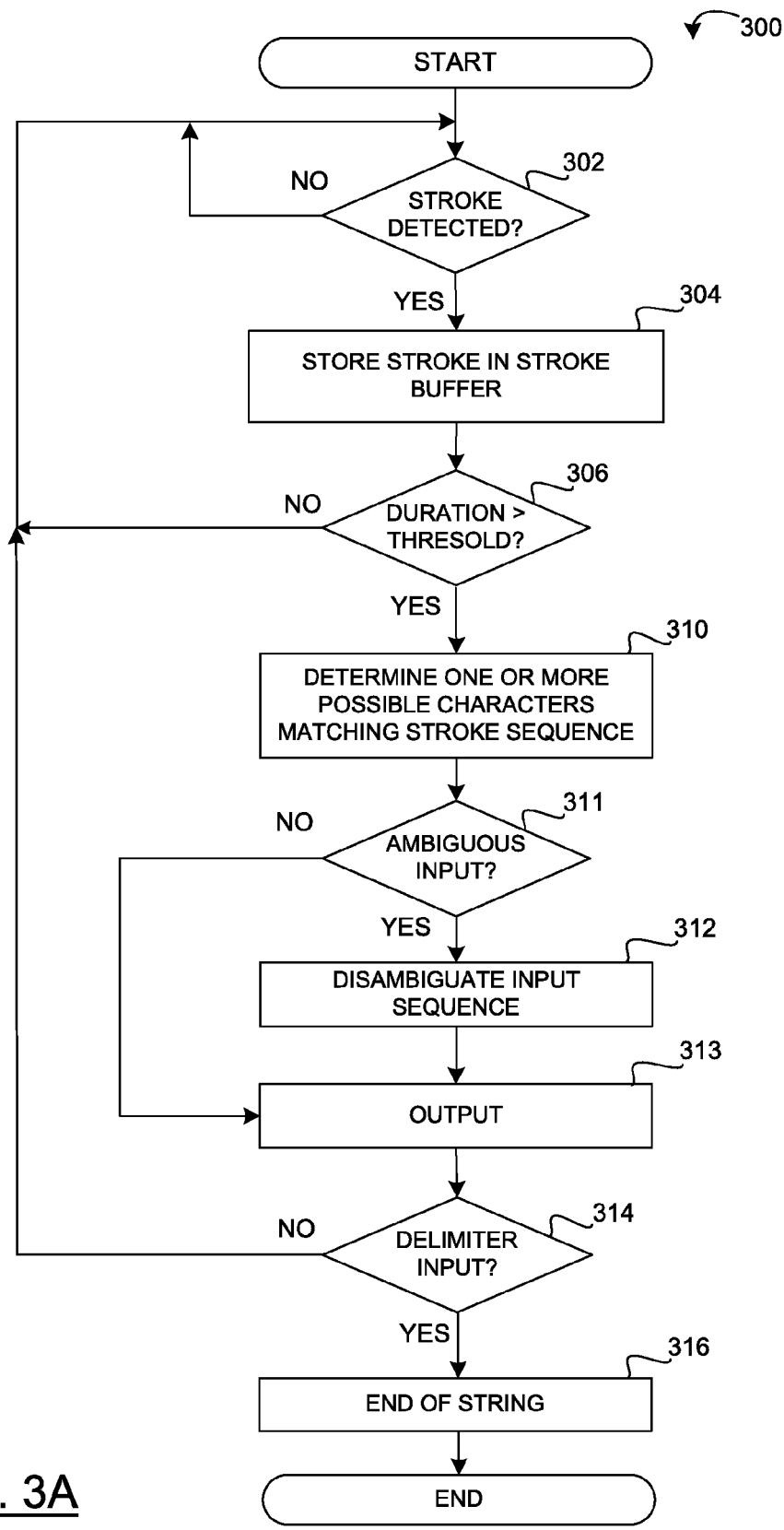
FIG. 3A is a flowchart illustrating a method of receiving input and outputting characters using a sound signature of strokes in accordance with one example embodiment of the present disclosure.

Referring now to FIG. 3A, an example process 300 for receiving input and outputting characters such as alphanumeric characters on a portable electronic device 100 in accordance with one embodiment of the present disclosure will be described. The steps of FIG. 3A may be carried out by routines or subroutines of software executed by, for example, the processor 102. The coding of software for carrying out such steps is well within the scope of a person of ordinary skill in the art given the present disclosure.

The portable electronic device 100 monitors for and detects strokes using its microphone 130 (block 302). Audible sounds are generated by strokes written or otherwise performed on a writing surface using a finger, fingernail, pen, stylus or other suitable writing instrument. The strokes may be performed on any surface which generates an audible sound in response to a stroke. For convenience, the surface on which the strokes are written will be referred to as the writing surface. The term "writing surface" is used for convenience and is not intended to be limiting.

In accordance with the present disclosure, alphanumeric characters are broken up into a stroke sequence comprising one or more strokes, wherein each stroke in the stroke sequence is one of a number of predetermined stroke types. The type of each stroke in each stroke sequence is identified in accordance with predefined sound signatures (also known as predefined sound patterns) for a number of predetermined stroke types. In some embodiments, each stroke in each stroke sequence is identified as being a first stroke type or second stroke type. More than two types of strokes may be recognized in other embodiments.

In some embodiments, the alphanumeric characters are broken up into a sequence of straight or curved strokes in which case the first stroke type is a straight stroke and the second stroke type is a curved stroke. A straight stroke may be a vertical, horizontal or diagonal stroke or line. A curved stroke may be any curved stroke or line such as, for example, curved strokes having an open area facing left, right, up or down. There may be one, or more than one, alphanumeric character that corresponds to a particular stroke sequence. That is, some alphanumeric characters have a unique stroke sequence that no other alphanumeric character corresponds to. However, other alphanumeric characters do not have a unique stroke sequence and multiple alphanumeric characters correspond to these stroke sequences. When multiple alphanumeric characters correspond to a stroke sequence, the input is ambiguous and disambiguation procedures are performed as described below.

Referring now to FIGS. 4 to 9, example character mappings which define characters in terms of a corresponding stroke sequence will be described. In the shown examples, the character mappings consider the order of the strokes within each stroke sequence. However, it is possible that order may not be considered if a suitable text disambiguation function 166 is provided, as described in more detail below.

Figures 6, 7:
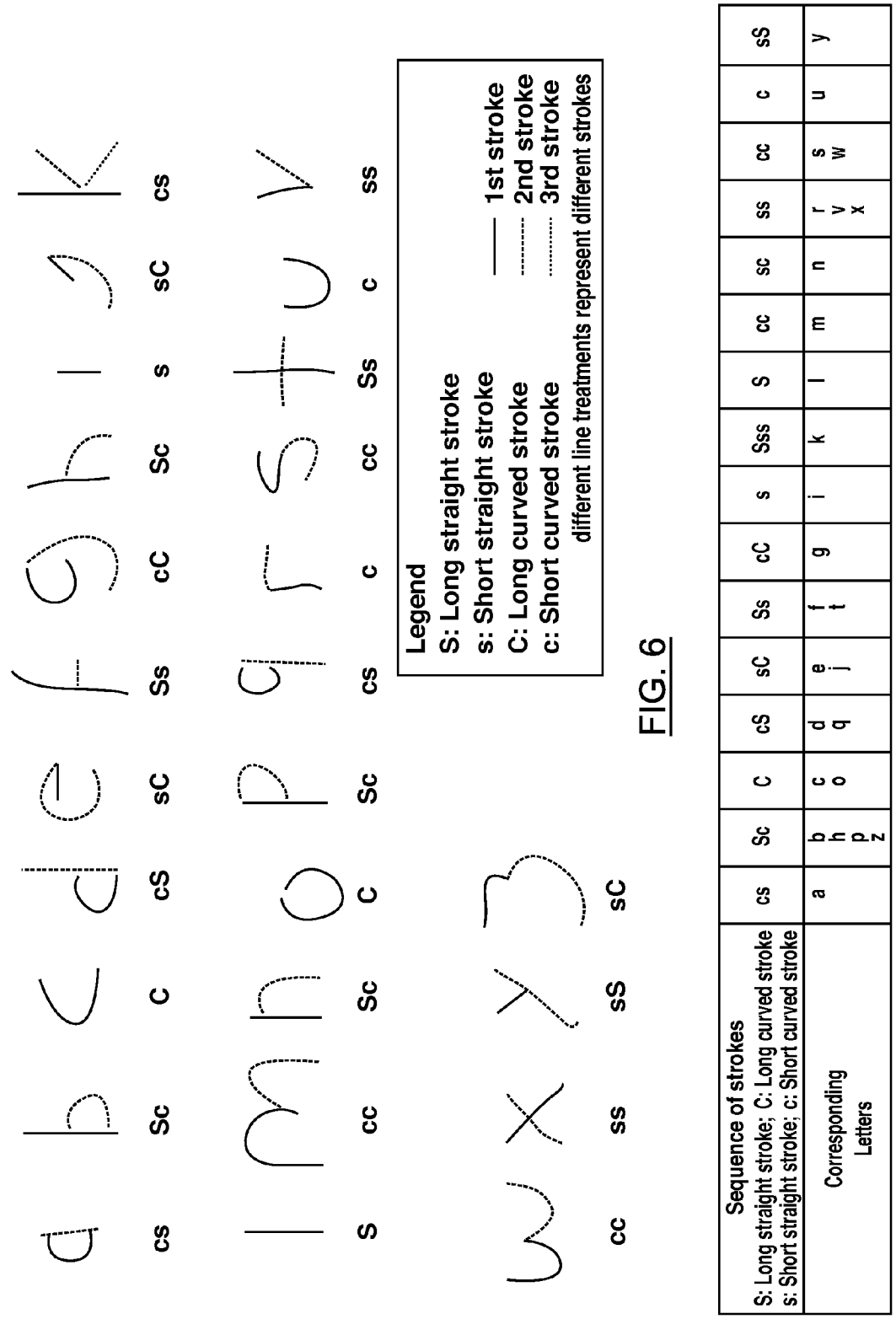
FIG. 6 is a diagrammatic representation of lower case letters using straight and curved strokes in accordance with one example embodiment of the present disclosure.
FIG. 7 is a chart illustrating predetermined character mappings for lower case letters in accordance with one example embodiment of the present disclosure.
Figures 8, 9:
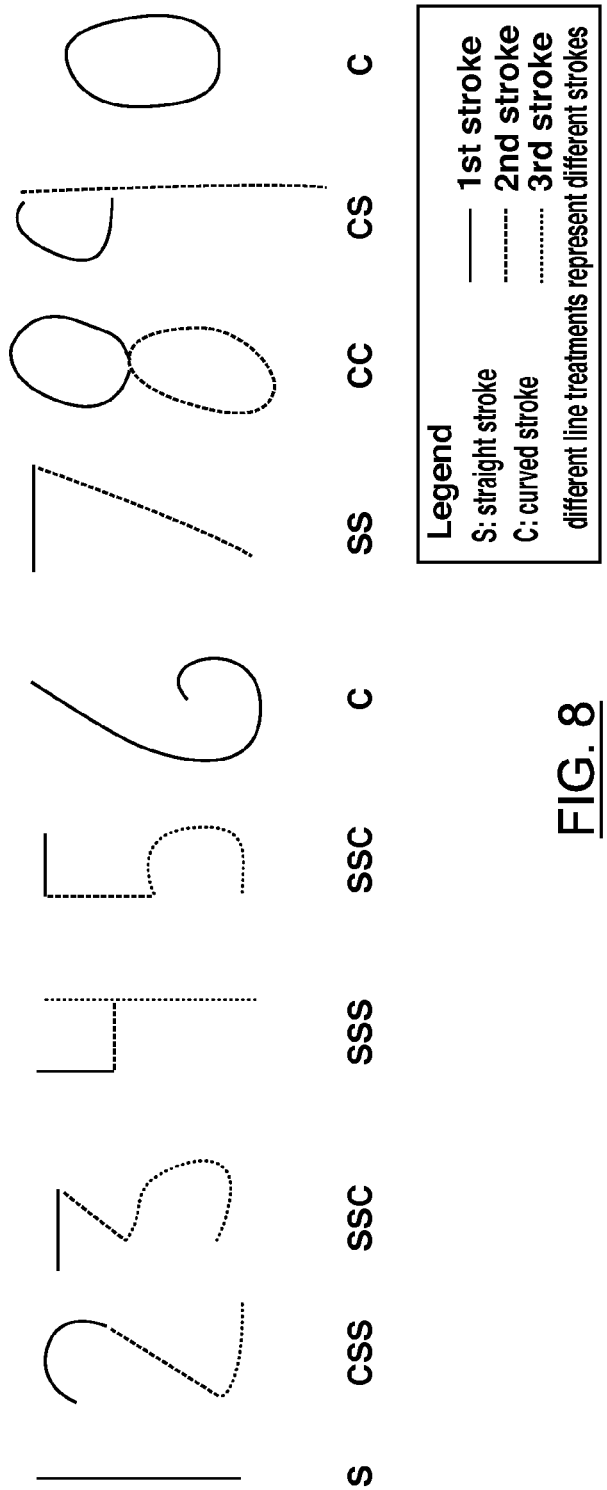
FIG. 8 is a diagrammatic representation of numbers using straight and curved strokes in accordance with one example embodiment of the present disclosure.
FIG. 9 is a chart illustrating predetermined character mappings for numbers in accordance with one example embodiment of the present disclosure.

FIG. 4 is a diagrammatic representation of upper case letters using straight and curved strokes in accordance with one example embodiment of the present disclosure is shown, and FIG. 5 shows the predetermined character mappings for upper case letters using straight and curved strokes in accordance with one example embodiment of the present disclosure. In FIGS. 4, 6 and 8, different stroke types are represented using different line patterns while the same stroke type is represented using the same line pattern.

FIG. 6 is a diagrammatic representation of lower case letters using straight and curved strokes in accordance with one example embodiment of the present disclosure is shown, and FIG. 7 shows predetermined character mappings for lower case letters using straight and curved strokes in accordance with one example embodiment of the present disclosure. FIG. 7 illustrates an alternate embodiment, described more fully below, in which strokes may be further differentiated by a respective duration of the stroke. In the shown example, the stroke recognition function 162 can differentiate between long straight strokes, short straight strokes, long curved strokes and short curved strokes. In other embodiments, lower case letters may be differentiated merely as straight strokes or curved strokes without regard to the respective duration of the strokes. The duration of a stroke is a secondary stroke characteristic that may be used in differentiating between any character, whether an upper case letter, lower case letter, number or possibly even a symbol or special character, depending on the embodiment.

FIG. 8 is a diagrammatic representation of numbers using straight and curved strokes in accordance with one example embodiment of the present disclosure is shown, and FIG. 9 shows predetermined character mappings for numbers using straight and curved strokes in accordance with one example embodiment of the present disclosure.

It will be appreciated that some of the stroke sequences of strokes are unique and correspond to a single alphanumeric character. For example, as shown in FIG. 5, upper case letter "I" is the only letter represented by a single straight stroke, upper case letter "S" is the only letter represented by two consecutive curved strokes, and upper case letter "B" is the only letter represented by a straight stroke, curved stroke, and curved stroke. No other upper case letter corresponds to these stroke sequences, as shown in FIG. 5. In contrast, other stroke sequences may correspond to multiple alphanumeric characters. For example, as shown in FIG. 5, a stroke sequence comprising a curved stroke followed by a straight stroke may correspond to an upper case letter "G" or an upper case letter "Q". Similarly, a straight stroke followed by a curved stroke may represent the upper case letter "D" or upper case letter "P".

The Latin alphabet is used in some embodiments of the present disclosure; however, the method of the present disclosure may be adapted for use within any suitable alphabet which may include a non-Latin European alphabet such as Cyrillic, a Middle Eastern alphabet or script such as Arabic, Hebrew or Syriac, or an Asian alphabet such as Chinese pinyin. In embodiments using the Latin alphabet, the alphanumeric character set consists of numbers 0 to 9 and letters A to Z. The alphanumeric character set used in the method may comprise lower case letters, upper case (capital) letters, or both. In embodiments in which only lower case letters or only upper case letters are used, the alphanumeric character set has 36 alphanumeric characters. However, in embodiments in which lower case and upper case letters are used, the alphanumeric character set has 62 alphanumeric characters.

When writing alphanumeric characters, a device user writes or otherwise performs strokes corresponding to one or more characters on the writing surface in the ordinary way. The writing surface may be a textured surface (not shown). Textured surfaces improve stroke detection by enhancing the sound produced by the strokes and generating sounds which are more distinct between different stroke types. The textured surface may be located on the exterior of the housing 200 or a textured pad (not shown) of the portable electronic device 100 which is exposed by the housing 200. Alternatively, a textured pad external to the portable electronic device 100 may be used.

A textured pad is a writing pad with a textured surface. The texture on the pad surface is typically regularly or uniformly textured so that each stroke generates a relative consistent sound over its duration. In some embodiments, the texture on the pad surface may comprise uniformly distributed protrusions (e.g. ribs, dimples or bumps) arranged in a predetermined pattern, or uniformly distributed grooves defined in the pad surface in a predetermined pattern. The predetermined pattern could be, for example, a lattice or grid, striped, diagonal or zigzag pattern. The uniformly distributed protrusions may be micro-features in some embodiments. Micro-features are small protrusions several microns in size. The shape of the protrusions may vary between embodiments.

A uniformly textured pad generates monotone vibratory signals for strokes in one direction (e.g., a horizontal stroke from left-to-right or left-to-right, a vertical stroke from up-to-down or down-to-up, or a diagonal stroke). However, a uniformly textured pad generates multi-tone vibratory signals for strokes in multiple directions (e.g., curved strokes). A stroke on a finely-textured pad generates a signal of relatively high frequency whereas a stroke on a loosely-textured pad generates a relatively low frequency signal. When using a single-texture pad, different strokes may be classified and recognized. Between different single-texture pads, the same strokes will be classified and recognized differently. One or more textured surfaces may be assembled to one patchwork pad.

In some embodiments, the textured surface may be a multi-textured surface which defines a different textured pattern in at least two directions so as to create different audible sounds when a particular stroke is performed on the textured surface in each of the at least two directions. For example, the textured surface may be bi-directionally textured so as to have a different textured pattern in the direction of its length and width (referred to as "x" and "y" directions for convenience). Typically, two textures of a bidirectional textured surface have a direction or orientation which is perpendicular to the direction or orientation of the other. The different textures in the "x" and "y" directions generate enhanced and distinct sounds between different types of strokes such as, for example, between straight strokes and curved strokes. The more distinct the sound signature for the different types of strokes, the less processing is required by the stroke recognition function 162 to differentiate between different types of strokes (such as straight strokes and curved strokes) as described below. The use of different textures in the "x" and "y" directions may also generate distinct sound signatures between a straight vertical stroke, a straight horizontal stroke and a straight diagonal stroke. This may allow the processor 102 to further distinguish between straight vertical strokes, straight horizontal strokes and straight diagonal strokes. The greater the number of stroke types which may be detected by the stroke recognition function 162 the easier it is for the processor 102 to differentiate between stroke sequences.

In other embodiments, any external surface of the housing 200 or any surface in the device environment may be used as the writing surface. For example, a portion of the back of the portable electronic device 100, such as the cover plate for accessing an internal compartment of the portable electronic device 100, may be used as the writing surface. Alternatively, the surface of a desk or other surface on which the portable electronic device 100 is resting may be used as the writing surface.

In some embodiments, the writing surface may be the display screen 112 of the portable electronic device 100. When the display screen 112 is part of a touch-sensitive display 118, the device user may select a mode of the portable electronic device 100 which causes it to ignore touch inputs on part or all of the touch-sensitive display 118 when using sound strokes for input. Alternatively, a touchpad (not shown) of the portable electronic device 100 exposed by the housing 200 or external to the portable electronic device 100 may be used as the writing surface. A touchpad may be advantageous for writing alphanumeric characters in comparison to the display screen 112 since touchpads typically having a textured surface which will enhance the sound of strokes written on its touch-sensitive surface 118. In comparison, the display screen 112 typically has a glass cover plate or lens with a low coefficient of friction which may generate stroke sound signatures which are less distinct between stroke types compared with other surfaces having higher coefficients of friction.

In some embodiments, a specialized writing instrument such as a specialized pen or stylus may be used for writing/performing strokes on a textured surface or untexturized surface. The specialized writing instrument includes a specialized tip having physical features which generate different sounds in different stroke orientations. In some embodiments, the specialized tip may have a uniformly textured surface such as, for example, a grid or other pattern of unidirectional micro-features.

In accordance with one embodiment, the writing instrument comprises a stylus having an elongate body with opposed ends one of which defines a tip. The tip has a textured surface configured to generate audible sounds when held in contact engagement with and moved across a surface (e.g., the writing surface). The textured surface of the tip is configured to generate distinct audible sounds in response to each of a number of predetermined directions of movement. The writing instrument may also comprise a microphone located towards the tip of the body, and an output device connected to microphone for receiving and outputting acoustic signals generated by the microphone in response to audible sounds detected by the microphone. The writing instrument picks up the audible sounds made by strokes with its microphone and sends acoustic signals back to the portable electronic device 100 for processing by the processor 102 via the stroke recognition function 162. The writing instrument and the portable electronic device 100 may be configured to communicate via a short range wireless communication protocol (e.g., Bluetooth™). In such embodiments, the output device of the writing instrument is a short range wireless transmitter or short range wireless transceiver. Alternatively, the writing instrument and the portable electronic device 100 may be configured for a wired connection, for example, a USB connection between the data port 126 or a 3.5 mm audio jack of the portable electronic device 100 and a corresponding data port or plug provided by the output device of the writing instrument.

In some embodiments, the microphone 130 of the portable electronic device 100 may be used to detect the audible sounds generated by strokes written or otherwise performed on the writing surface. Alternatively, an external microphone (not shown) connected to the portable electronic device 100 may be used to detect the audible sounds generated by strokes written or otherwise performed on the writing surface. The external microphone may be embedded in the writing surface (e.g., the textured surface of the housing 200 or a textured pad) or a writing instrument (e.g., such as a stylus). A microphone in the writing instrument may be located at or near the tip of the writing instrument for improved pickup of audible sounds generated by the strokes.

In some embodiments, an accessory or peripheral device (not shown) to the portable electronic device 100 may be provided for use in practising the teachings of the present disclosure. The accessory may comprise a textured pad with an embedded microphone or a writing instrument with the microphone located towards its tip. The microphone in the accessory may connect directly to the portable electronic device 100 via its data port 126 or a 3.5 mm audio jack (which may be part of the auxiliary I/O 124), thereby transmitting acoustic signals detected by the microphone to the processor 102. It will be appreciated that if the internal microphone 130 of the portable electronic device 100 is used and an external textured pad is provided, the external textured pad may be considered an accessory; however, it is typically not connected to the portable electronic device 100.

More than one microphone may be used to aid in differentiating stroke directions, stroke type or both. In some embodiments, two microphones 130 may be provided by the portable electronic device 100. The two microphones 130 are spaced apart, for example, at opposite ends of the housing 200. For example, the two microphones 130 may be located at opposite ends of a bottom of a face plate of the housing 200. Using the disparity between audible sounds picked by the microphones 130 during a stroke, the stroke recognition function 162 may be able to more accurately differentiate between the directions of the stroke, i.e. whether a stroke is moving towards or away from a respective microphone 130, and to more accurately differentiate between the type of the stroke. Multiple microphones could be located in the textured surface of the housing 200 or in a textured pad exposed by the housing 200. In embodiments in which an external microphone is used, multiple microphones may be embedded directly in the writing surface, for example, in the textured pad.

Referring again to FIG. 3A, the processor 102 detects strokes by comparing audible sounds generated when a user writes on the writing surface. These audible sounds are detected by the microphone 130 and compared to predefined sound signatures stored in memory 110. Different types of strokes generate different sound signatures which can be differentiated by the stroke recognition function 162. When the audible signal matches a predefined sound signature, a stroke is detected. The predefined sound signatures detected by the stroke recognition function 162 may vary between embodiments. As described above, the use of a textured surface may permit a greater number of predefined sound signatures to be detected by the stroke recognition function 162 by increasing the distinctiveness of each stroke type. In one embodiment, the stroke recognition function 162 may detect straight strokes and curved strokes. Straight strokes and curved strokes can be differentiated by a relatively simple sound processing function because their audio signatures are different from each other and from background noise.

While stroke detection and stroke recognition are described as occurring in one step, it will be appreciated that this process could be performed in multiple logical steps, for example, by first detecting the stroke by comparing audible sounds to a generic stroke sound signature or all of the sound signatures stored in memory 110, and then determining the type of stroke. While functional, this alternative may be more computationally expensive.

In some embodiments, the stroke recognition function 162 can differentiate between vertical, horizontal and diagonal strokes in contrast to a simpler stroke recognition function 162 in which strokes can only be determined to be a straight stroke or curved stroke.

This may be possible, for example, by using a multi-textured surface (e.g., bi-directionally textured surface) as described above. The multi-textured surface increases the differences in audible sounds generated by different stroke types. The greater the number of stroke types which may be identified by the stroke recognition function 162, the easier it is for the processor 102 to differentiate between stroke sequences and the greater the number of characters which can be uniquely identified solely by stroke sequence without disambiguation. For example, as shown in FIGS. 4 and 5, the upper case letters "A", "F" and "H" all correspond to a sequence of three straight strokes. If the stroke recognition function 162 differentiates between vertical, horizontal and diagonal strokes, for example, as a result of the multi-textured surface, these letters can be uniquely identified solely by the stroke sequence since each letter is comprised of a unique sequence of vertical, horizontal and diagonal strokes.

In some embodiments, the multi-textured surface may be configured to generate and the stroke recognition function 162 may be configured to differentiate between distinct sound signatures of a curved vertical stroke (e.g., U-shaped) and a curved horizontal stroke (e.g., C-shaped). In other embodiments, the multi-textured surface may be configured to generate and the stroke recognition function 162 may be configured to differentiate between distinct sound signatures of an upward curved vertical stroke ("∪" shaped), downward curved vertical stroke ("∩" shaped), leftward curved horizontal stroke ("⊃" shaped) and rightward curved horizontal stroke ("⊂" shaped). This further increases the number of stroke types which may be detected by the stroke recognition function 162, making it even easier for the processor 102 to differentiate between stroke sequences and increases the number of characters which can be uniquely identified solely by stroke sequence without disambiguation.

In some embodiments, the stroke recognition function 162 may differentiate between strokes based on a respective duration of the strokes. This may occur in embodiments in which the stroke recognition function 162 only differentiates between straight strokes and curved strokes, or embodiments in which the stroke recognition function 162 differentiates between different types of straight strokes, curved strokes or both, in the manner described above. These embodiments require the preliminary step of determining the duration of the detected strokes.

The stroke recognition function 162 may differentiate a detected stroke as corresponding to either a short straight stroke or a long straight stroke based on the duration of the detected stroke. The straight stroke is a short straight stroke when the duration is less than a first predetermined duration threshold, and the straight stroke is a long straight stroke when the duration is greater than or equal to the first predetermined duration threshold. The value of the first predetermined duration threshold may vary or be configurable. Similarly, the stroke recognition function 162 may differentiate a detected stroke as corresponding to either a short curved stroke or a long curved stroke based on the duration of the detected stroke. The curved stroke is a short curved stroke when the duration is less than the first predetermined duration threshold, and the curved stroke is a long curved stroke when the duration is greater than or equal to the first predetermined duration threshold.

Differences between the duration of the stroke allow further differentiation of straight stroke which can be used to more accurately match stroke sequences to alphanumeric characters. This results in more accurate and efficient character recognition. For example, if the stroke recognition function 162 only differentiates between straight strokes and curved strokes, the stroke sequence "straight; straight; straight" may correspond to upper case letters "A" and "F" as shown in FIGS. 4 and 5. However, if the stroke recognition function 162 differentiates between short straight strokes and long straight strokes based on the duration of the detected stroke, it may be possible to differentiate between upper case letter "A" as a stroke sequence "long straight; long straight; short straight" and the upper case letter "F" as a stroke sequence "long straight; short straight; short straight". Thus, differentiation between short and long strokes reduces the number of possible alphanumeric characters that correspond to detected stroke sequences. This may result in fewer alphanumeric character permutations being sent to the text disambiguation function 166, reducing the number of computations and making the overall function more efficient.

Referring again to FIG. 3A, after each stroke is detected it is stored temporarily in a stroke buffer 152 maintained in RAM 108, or possibly memory 110, for later comparison (block 304). The stroke buffer 152 stores stroke sequences for each character being input in accordance with a stroke type of each stroke in the stroke sequence.

In embodiments in which the recognized stroke types are straight strokes and curved strokes, the strokes may be stored in the stroke buffer 152 in any desired format which identifies the stroke type and maintains the order of the strokes. For example, in some embodiments the letter "S" may be used to represent and store a straight stroke and the letter "C" may be used to represent and store curved strokes. In some embodiments in which the duration of strokes is recognized, the upper case letter "S" may be used to represent and store a long straight stroke, the lower case letter "s" may be used to represent and store a short straight stroke, the upper case letter "C" may be used to represent and store a long curved stroke, and the lower case letter "c" may be used to represent and store a short curved stroke. Alternatively, a different letter, letter combination or number may be used to represent the stroke type in other embodiments (e.g., 1 for straight strokes; 2 for curved strokes; or 1 for long straight strokes; 2 for short straight strokes, 3 for long curved strokes, and 4 for short curved strokes). Other values or symbols, or alternative schemes may be used to represent and store strokes in other embodiments. Other stroke types may be represented by other predefined letters, letter combinations, numbers or other suitable format. The time at which the stroke was detected may also be stored, for example in the stroke buffer 152 with the corresponding stroke type, depending on the embodiment. The stroke buffer 152 may comprise, or be replaced with, a stroke log which records stroke type and stroke time for each detected stroke.

After the stroke is stored in the stroke buffer 152, the portable electronic device 100 then determines the duration between a previous stroke and a current stroke (block 306). The current stroke is the mostly recently detected stroke which was just stored in the stroke buffer 152 (block 304). The previous stroke is the stroke immediately preceding the current stroke in the stroke buffer 152. The duration between strokes may be used to differentiate between strokes of a common stroke sequence defining a particular character. In other embodiments, it is contemplated that stroke sequences may be differentiated using other factors such as the text disambiguation function 166.

Figure 3B:
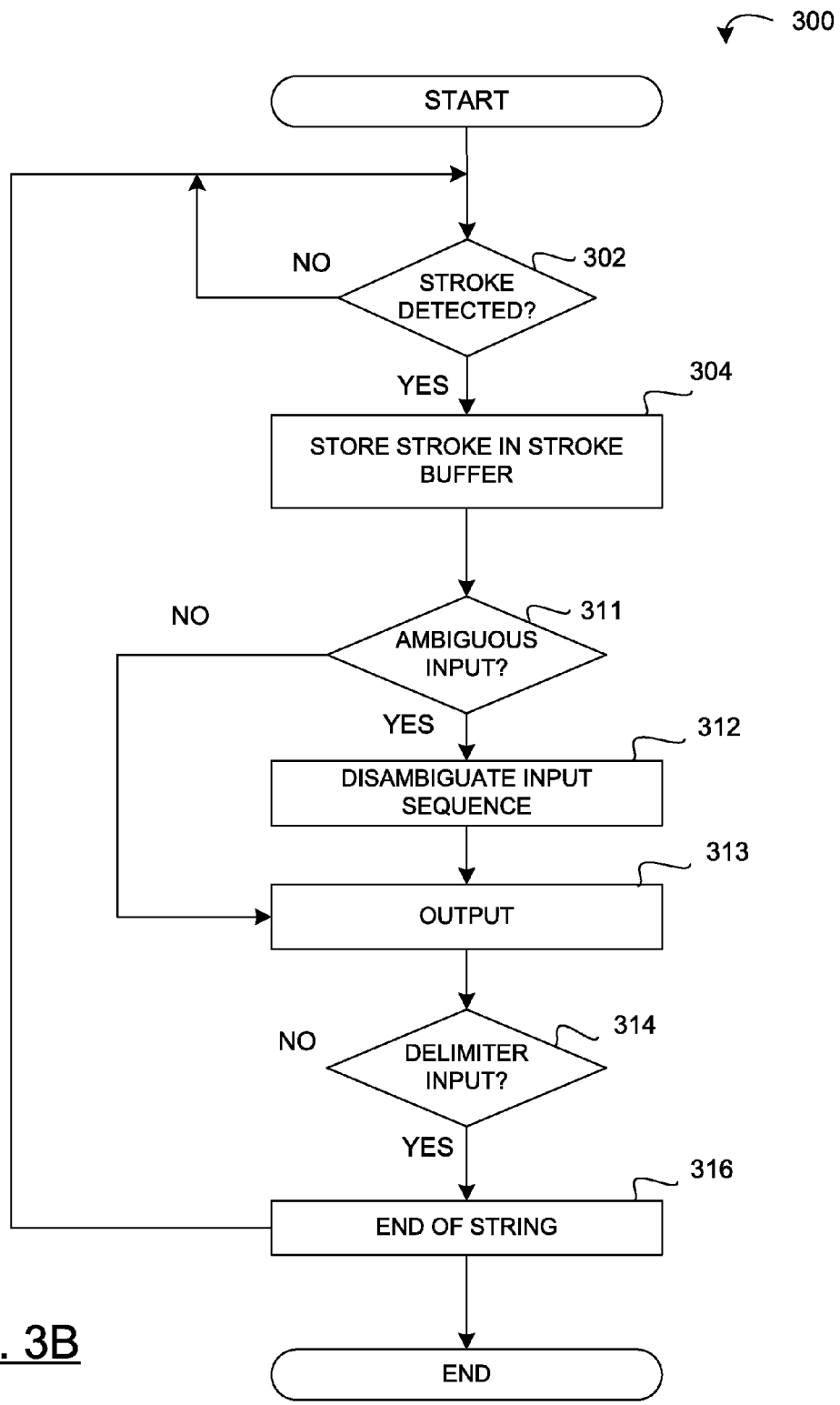
FIG. 3B is a flowchart illustrating a method of receiving input and outputting characters using a sound signature of strokes in accordance with another example embodiment of the present disclosure.

FIG. 3B illustrates an alternate embodiment in which the duration between strokes is not considered and all strokes are considered by the text disambiguation function 166 based on the order detected. The steps 306 and 310 from the process of FIG. 3A are omitted in this alternate embodiment. This may allow a greater number of character permutations to be defined and considered by the text disambiguation function 166. The text disambiguation function 166 starts running before the end of a full character and makes use of the strokes of a partially written character to update its disambiguation algorithm. This means that the text disambiguation function 166 can suggest words while in mid character. For instance, if the letters "BR" have already been input (according to FIG. 5 these letters are easy to identify and not ambiguous). If the first stroke of the letter "A" is input, but not the last two, text disambiguation function 166 has enough information to eliminate the potential candidates "C", "O" and "U" for the next letter. This is valuable information to the text disambiguation function 166.

Referring again to FIG. 3A, when the duration between strokes is considered, the current stroke is treated as part of a common stroke sequence defining a single alphanumeric character (block 308) when the duration between the previous stroke and the current stroke is less than a second predetermined duration threshold. Processing then returns to block 302 where new strokes defining other parts of the alphanumeric character are detected. The second predetermined duration threshold used in step 306 is typically in the order of milliseconds and may be configurable to accommodate different writing styles between users.

When the duration between the previous stroke and the current stroke is greater than or equal to the second predetermined duration threshold, the current stroke is part of a new stroke sequence defining a new alphanumeric character. The processing then continues to step 310 where the stroke sequence in the stroke buffer 152 is output to a character recognition engine 164. The stroke buffer 152 is then cleared for the next character.

The character recognition engine 164 receives as input the stroke sequence stored in the stroke buffer 152 and compares the stroke sequence to predetermined character mappings to determine for output at least one character which matches the stroke sequence (block 310). Each predetermined character mapping defines characters in accordance with a predetermined stroke sequence such as, for example, that shown in FIG. 5, 7 or 9. Each stroke in the stroke sequence is one of a number of predetermined stroke types such as, for example, a straight stroke or curved stroke. The character recognition engine 164 maintains and stores a character set defining one or more characters that match each stroke sequence in a character buffer 154 maintained in RAM 108, or possibly memory 110. The alphanumeric characters may be stored in the character buffer 154 in any suitable format such as, for example, a table, mapping or listing of the stroke sequence and the one or more characters matching the stroke sequence.

The content of the character buffer 154 defines an input sequence which is gradually built up with each stroke sequence for a given input string (e.g., word). Input strings are differentiated using delimiter input. When delimiter input separating the input sequences is detected, a new input string is started. The delimiter input may be, for example, a tap performing on a surface such as, for example, the writing surface, desktop or other supporting surface upon which the portable electronic device 100 is resting, or a surface of the portable electronic device 100 itself. The tap may be detected using the microphone 130 in accordance with a predetermined sound signature for a tap or using an accelerometer (not shown) using a predetermined motion signature for a tap.

In other embodiments, the delimiter input may be a motion gesture detected by the accelerometer or a touch gesture performed on the touch-sensitive display 118. In yet other embodiments, the delimiter input may, for example, the actuation of a <SPACE> key of a keyboard, actuation of an <ENTER> key of the keyboard, actuation of the one or more actuators 120 by pressing the touch-sensitive display 118, or movement of a navigation device which may enter a delimiter input without additionally entering a space.

The character recognition engine 164 may be context-sensitive in some embodiments. In such embodiments, the character recognition engine 164 may compare the stroke sequence to a subset of the predetermined character mappings so as to limit the comparison to predetermined character mappings for a subset of alphanumeric characters. The subset of alphanumeric characters may be based on character type such as, for example, numbers, letters, lower case letters, upper case letters, etc. For example, if the method of the present disclosure is being used to input text in a text field limited to number values, the stroke sequence may only be compared to the predetermined character mappings for numbers. Similarly, if the text field is limited to letter values, the stroke sequence may only be compared to the predetermined character mappings for letters. The use of subsets of the predetermined character mappings may be applied within a text field if intra-field values have similar restrictions on character type.

In other embodiments, to assist in character recognition a predetermined input such as a predetermined stroke sequence may be used to provide a hint as to the type of character or characters which are about to be input, or which were just input. The predetermined stroke sequence should be a unique stroke sequence which does not match any characters in the predetermined character mappings used by the character recognition engine 164, such as, for example, the stroke sequence of "curved; curved; curved". Detection of the predetermined stroke sequence may be used to switch the predetermined character mapping set used by the character recognition engine 164, for example, by cycling through the predetermined character mapping sets in a predetermined order (e.g., upper case letters, lower case letters, numbers, symbols, and then returning to the top of the list). Alternatively, each predetermined character mapping set may have its own predetermined stroke sequence which, when detected, causes the character recognition engine 164 to use the corresponding predetermined character mapping set.

The processor 102 examines the input sequence in the character buffer 154 to detect ambiguous inputs. An ambiguous input exists and is detected when a number of characters match a particular stroke sequence (block 311). When no ambiguous input is detected, processing proceeds to block 313 where a string comprising one or more characters which match the detected stroke sequences is output, e.g. displayed on the display screen 112.

When at least one ambiguous input is detected, the content of the character buffer 154 is input to the text disambiguation function 166 (block 312). The text disambiguation function 166 disambiguates the input sequence to generate an output set comprising a number of strings corresponding with each of ambiguous input.

The input sequence is built up in each "session" with each stroke sequence. Since an input sequence is typically made up of at least one stroke sequence having a number of matching characters, the input sequence will be ambiguous. The current session is ended and a new session is initiated when each string is completed. The completion of the string may be determined when delimiter input separating each input string (e.g., word) is detected. When delimiter input separating each input sequence is detected, the output set corresponding with the ambiguous input is newly generated for the new input sequence when an ambiguous input exists.

The input sequence is gradually built up with each successive stroke sequence during any given session. The text disambiguation function 166 is generally executed with each stroke sequence as the input sequence grows during a given session. That is, within a given session the text disambiguation function 166 attempts to disambiguate the growing input sequence as a whole with each successive stroke sequence.

The text disambiguation function 166 is performed on each character set generated by the character recognition engine 164 and with each successive character set, thereby being applied to the entire input sequence. When a character set representing the most recent stroke sequence is added to the input sequence in the current session, the text disambiguation function 166 generates an output set comprising a number of strings corresponding with the ambiguous input. Each string in the output set includes a particular character of the number of matching characters for a particular stroke sequence (e.g., for ambiguous inputs). Depending on the embodiment, all characters in the input sequence which uniquely match stroke sequences (e.g., unambiguous inputs) may be fixed in the strings in the output set. When more than one ambiguous input is detected, the output set comprising strings defining each permutation of the number of characters matching a particular stroke sequence for each ambiguous input.

The output set includes strings for all or substantially all of the permutations of the characters associated with the various stroke sequences that were detected in building the current input sequence. In this regard, the term permutations" refer to the various strings that can result from two or more characters being associated with ambiguous stroke sequences and ambiguous input sequences, limited by the order in which the stroke sequences were detected. The strings in the output set may complete strings (e.g., words) even when only a partial input string has been input, depending on the configuration of the text disambiguation function 166. As a result, the strings in the output set may have more characters than the input sequence. For example, an input sequence with a four character permutation of "thei" may have an output set with a five character string "their". When provided output set provides selectable strings as output, device users may select a complete string from the output set by corresponding selection input without writing the last character.

Figure 1B:
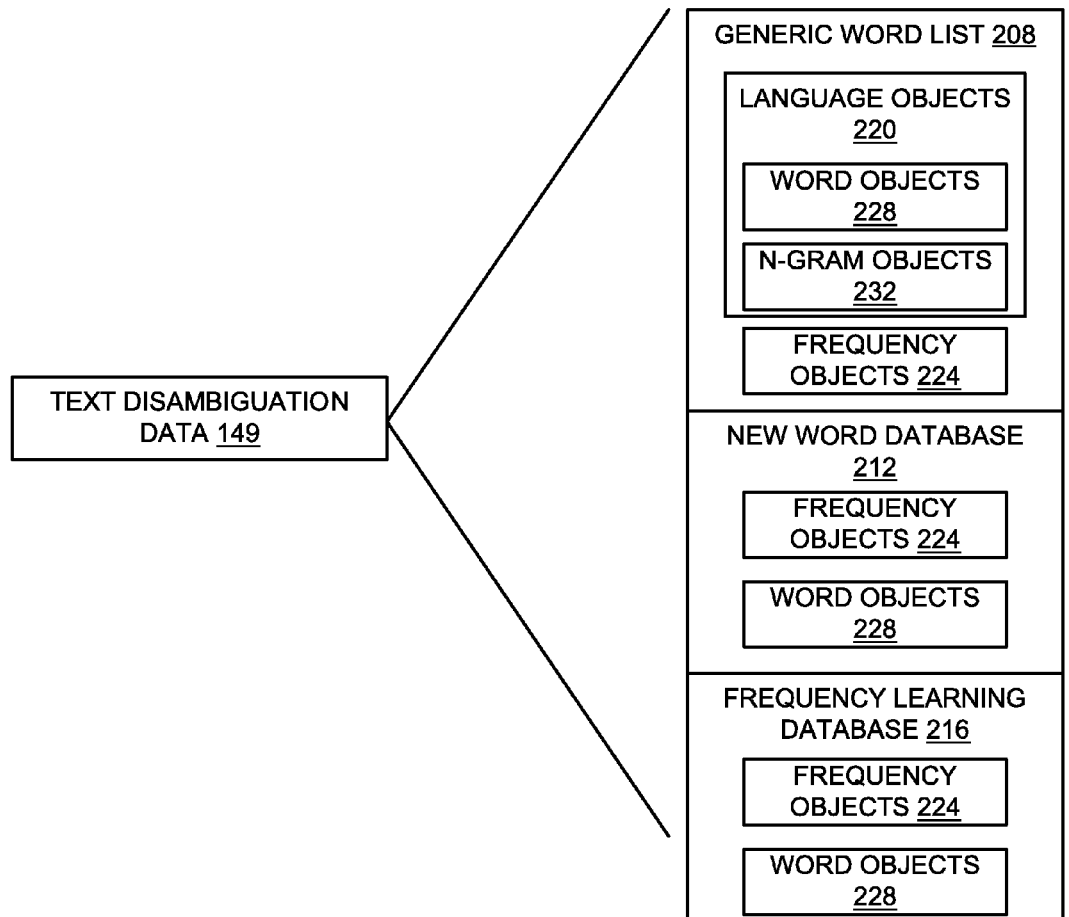
FIG. 1B is a schematic diagram showing text disambiguation data used by a text disambiguation function of the portable electronic device of FIG. 1.

Referring briefly to FIG. 1B, each permutation is compared against language objects 220 stored in memory 110 to determined matching language objects 220. The language objects 220 include a plurality of word objects 228 and a plurality of N-gram objects 232, described more fully below. Briefly, the N-gram objects 232 are short strings of characters, for example, one to three characters in length, and typically represent word fragments. The language objects 220 generally are each associated with an associated frequency object 224 having a frequency value that is indicative of the relative frequency within the relevant language.

The language objects 220 associated with each of the strings is determined, and the output set is sorted in descending order of frequency value of the associated language objects 220. When there is no associated language object 220, a frequency value of zero is assigned. It will be appreciated that each string may comprise one word object 228, one or more number of N-gram objects 232, or possibly a combination thereof.

Figure 10A:
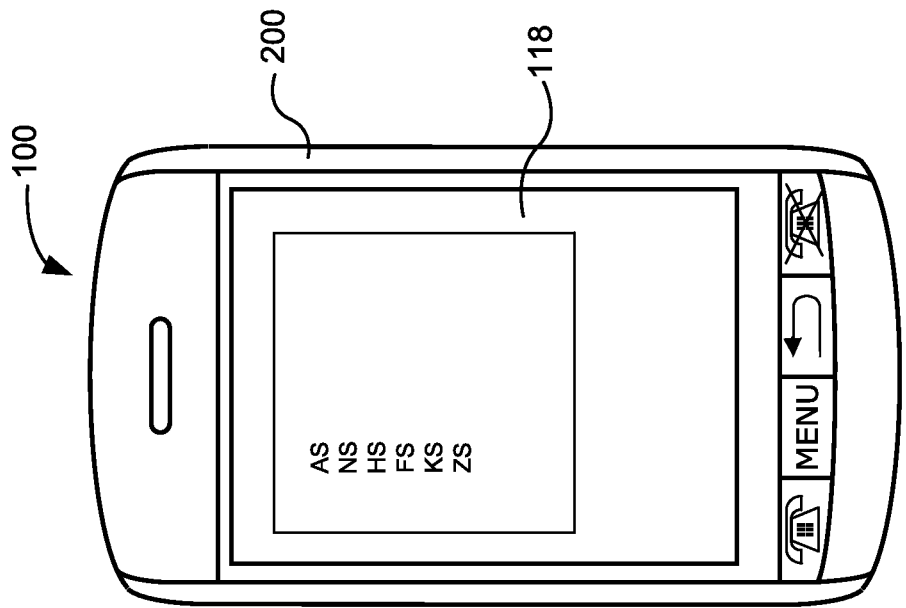
FIGS. 10A and 10B are front views of the portable electronic device of FIG. 2 in portrait orientation and displaying an example user interface screen having output from the method for receiving input and outputting characters in accordance with the present disclosure.

Next, at least a portion of the strings of the output set is output, e.g. displayed on the display screen 112 (block 313). The portion of the strings of the output set which is output is typically limited by the text size and the size of the display screen 112. In some embodiments, the portion of the strings of the output set which is output is sorted according to the frequency values associated therewith in descending order of frequency value. For example, if the stroke sequence was "straight; straight; straight" for a first character, the number of matching characters is "A, F, H, K, N, and Z" when only straight strokes and curved strokes are recognized by the stroke recognition function 162. If the result of sorting the strings in descending order of frequency value is also "A, F, H, K, N, and Z", the output set may be displayed in this order on the display screen 112 as shown in FIG. 10A (descending order of frequency from top to bottom). The portion of the strings of the output set which is output may be limited to a predetermined number such as, for example, the five most frequently used.

Figure 10B:
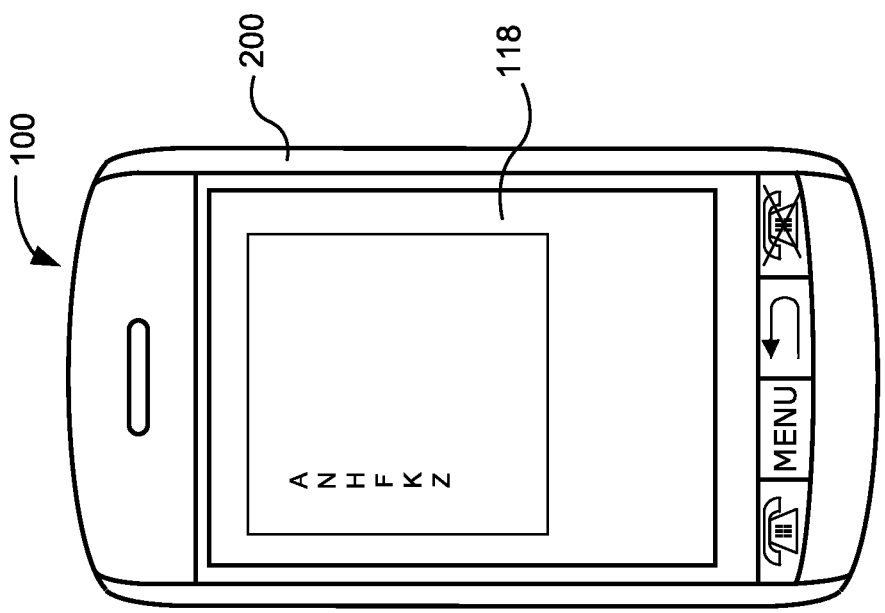

If the stroke sequence for second character in the same input sequence is "curved; curved", the matching character is "S" when only straight strokes and curved strokes are recognized by the stroke recognition function 162. The text disambiguation performed on this input sequence would determine all the permutations with "A, F, H, K, N, Z" in the first character position and "S" in the second character position. The resulting letter combination of "AS" has the highest frequency value, with the remaining permutations of these letters "FS, KS, NS, ZS" having a lower frequency value, possibly a frequency value of zero. As a result, the output set may be displayed on the display screen 112 in the order "AS, FS, KS, NS, ZS" as shown in FIG. 10B (descending order of frequency from top to bottom).

In some embodiments, complete strings (e.g., words) such as "AS" may be displayed before other strings irrespective of the frequency value. In some embodiments, if the input sequence matches only one complete string (e.g., there is only one matching word object 228), that string may be displayed while other permutations which do not define complete strings are hidden until additional characters in the input sequence are input. In yet other embodiments, only the string with the highest frequently value may be output.

The displayed strings may be selected by the user for example, using selection input. The selection input may be a tap or series of successive taps within a predetermined duration. The selection input is used to select a string such as an intended word from a list of displayed strings (e.g., words) suggested by the text disambiguation function 166. The number of taps may be used to select a particular string from the portion of the number of strings of the output set which are output (e.g., in the displayed strings) in accordance with a number of taps detected within a predetermined duration. The selected string will be the string having a position in the portion of the strings of the output set which is output which corresponds to the number of taps. For example, one tap may be used to select the first string (i.e., the highest frequency string), two taps may be used to select the second string (i.e., the second highest frequency string) and so on. The selected string is then output, for example, by acting as delimiting input which terminates current input sequence and outputs the select string on the display screen 112 while removing any other strings previously displayed as part of the output set. A delimiter character and/or space may be added.

The tap may be detected using the microphone 130 in accordance with a predetermined sound signature for a tap. Alternatively, the tap may be detected using an accelerometer (not shown) using a predetermined motion signature for a tap. Alternatively, the predetermined selection input may be a special stroke or other input such as a corresponding touch input on the touch-sensitive display 118.

A tap may be used for both selection input and delimiter input provided the tap used for each input differs, for example, if a hard tap is used for selection input and a soft tap is used for delimiter input, or vice versa. Similarly, a quick tap may be used for selection input and a slower tap may be used for delimiter input, or vice versa. To differentiate between these types of taps, the stroke recognition function 162 requires predetermined sound signatures for each type of tap that can be differentiated from each other, or a motion detection function (not shown) requires predetermined motion signatures for each type of tap that can be differentiated from each other.

Next, the portable electronic device 100 monitors for a delimiter input (block 314) which, for example, may be a tap. The tap or other delimiter input indicates that the user has finished inputting the current string (e.g., word). When delimiter input is detected, a delimiter symbol, space character, or both are added to the end of the string. When no delimiter input is detected, additional strokes are detected (block 302).

It will be appreciated that other inputs such as, for example, editing input, may be used by the text disambiguation function 166 to dynamically change the strings in the output set or the portion of the strings in the output set which are output as described in the U.S. patents mentioned below. Editing input may be received at any time during the session of a particular input sequence.

In some embodiments, the character recognition engine 164 may only recognize letters (e.g. upper case, lower case, or both). In such embodiments, taps may be used to input numbers where the number of taps within a predetermined duration is used to select a particular number from 0 to 9. The number zero (0) may be input using ten taps. Alternatively, taps may be used to select numbers from 1 to 9 where the number of taps within a predetermined duration is used to select a particular number, and a predetermined stroke sequence is used to select zero. Delimiter input between numbers may be a predetermined duration from the last tap without a further tap or other input. The tap may be detected by the microphone in accordance with a predetermined sound signature for a tap or using an accelerometer (not shown) using a predetermined motion signature for a tap.

While the above-described embodiments include a display screen 112, the teachings of the present disclosure can be applied to any electronic device having a microphone such as a wired or wireless appliance (e.g., Bluetooth™ or other short-range wireless device) connected to the portable electronic device 100. However, a display screen may be advantageous for outputting the result, selecting strings from an output set having multiple matching strings and/or editing the input and output set. When the host electronic device does not include a display, a user may indicate the end of a string by tapping against a surface (e.g., the writing surface) as described above.

While the foregoing description describes examples using primarily upper case letters, it will be appreciated that the teachings of the present disclosure may be applied to lower case letters and numbers. Additionally, the teachings of the present disclosure could be applied to non-Latin characters and non-Arabic numbers as well as symbols.

It will be appreciated that the order in which various strokes used in writing characters such as alphanumeric (e.g., the order of straight strokes and curved strokes used to write characters as shown in FIG. 4, 6 or 8) may vary between users. This is particularly true in the context of lower case letters where writing is often a more idiosyncratic process than for upper case letters. Moreover, the style of the letters and its constituent strokes (e.g., the number and configuration of straight strokes and curved strokes) may vary between users. As a result, inputting a stroke sequence different than the predetermined stroke sequence for a given character used by the character recognition engine 164 will result in an incorrect character being recognized and input, or possibly no character being recognized or input. As a result, valid input requires that characters are written or otherwise performed using the predetermined character mappings used by the character recognition engine 164 or erroneous input will be generated.

To accommodate differences in writing style, in some embodiments the predetermined character mappings used by the character recognition engine 164 may be selectable from a number of different sets of predetermined character mappings. The predetermined character mappings used by the character recognition engine 164 may be customizable so that the users may select between predetermined stroke sequences for a given character, a number of characters, or the full set of characters recognized by the character recognition engine 164.

In other embodiments, the character recognition engine 164 may have a configuration or learning mode in which the stroke sequence for each character may be programmed or defined by users to match their writing styles. In some embodiments, the predetermined character mappings used by the character recognition engine 164 may be customizable so that users may custom-define the stroke sequence used to recognize a given character. In some embodiments, user can define individual predetermined character mapping sets which map characters to corresponding stroke sequences. This allows users to customize the stroke sequences which define the alphanumeric characters to match their preferences. These solutions accommodate variations in the writing styles of characters (e.g., alphanumeric characters) and allow more accurate character recognition of the text the user is attempting to input.

The text disambiguation function 166 may operate in a similar fashion to that described in following U.S. Patents commonly owned by the owner of the present application: U.S. Pat. No. 7,644,209 directed to a "Handheld electronic device with text disambiguation allowing dynamic expansion of input key associations", and U.S. Pat. No. 7,477,238, U.S. Pat. No. 7,475,004, U.S. Pat. No. 7,389,124, U.S. Pat. No. 7,358,866, U.S. Pat. No. 7,352,296, U.S. Pat. No. 7,333,085, U.S. Pat. No. 7,324,083, U.S. Pat. No. 7,312,726, U.S. Pat. No. 7,289,044, U.S. Pat. No. 7,283,065 and U.S. Pat. No. 7,091,885 each directed to a "Handheld electronic device with text disambiguation". The content of each of these U.S. Patents is incorporated herein by reference. The methods taught in the above-mentioned patents may be adapted for use with the teachings of the present disclosure by modifying the logical steps associated with having many characters to one key in the above-mentioned patents to accommodate the many characters to one stroke sequence mentioned above.

As shown in FIGS. 1A and 1B, in one example embodiment of the memory 110 includes text disambiguation data 149 stored and/or organized in a number of tables, sets, lists, and/or otherwise. Specifically, the memory 110 includes a generic word list 208, a new words database 212, and a frequency learning database 216. Stored within the various areas of the memory 110 area number of language objects 220 and frequency objects 224. The language objects 220 generally are each associated with an associated frequency object 224. The language objects 220 include a plurality of word objects 228 and a plurality of N-gram objects 232. The word objects 228 are generally representative of complete words within the language or custom words stored in the memory 110. For example, if the language stored in the memory 110 is English, generally each word object 228 would represent a word in the English language or would represent a custom word.

Associated with substantially each word object 228 is a frequency object 224 having frequency value that is indicative of the relative frequency within the relevant language of the given word represented by the word object 228. In this regard, the generic word list 208 includes a corpus of word objects 228 and associated frequency objects 224 that together are representative of a wide variety of words and their relative frequency within a given vernacular of, for instance, a given language. The generic word list 208 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 232 stored within the generic word list 208 are short strings of characters within the relevant language typically, for example, one to three characters in length, and typically represents word fragments within the relevant language, although certain of the N-gram objects 232 additionally can themselves be words. However, to the extent that an N-gram object 232 also is a word within the relevant language, the same word likely would be separately stored as a word object 228 within the generic word list 208. As employed herein, the expression "string" and variations thereof shall refer broadly to an object having one or more alphanumeric characters, and can refer to any of a complete word, a fragment of a word, a custom word or expression, and the like.

In the present example embodiment, the N-gram objects 232 include 1-gram objects, i.e., string objects that are one character in length, 2-gram objects, i.e., string objects that are two characters in length, and 3-gram objects, i.e., string objects that are three characters in length, all of which are collectively referred to as N-gram objects 232. Substantially each N-gram object 232 in the generic word list 208 is similarly associated with an associated frequency object 224 stored within the generic word list 208, but the frequency object 224 associated with a given N-gram object 232 has a frequency value that indicates the relative probability that the character string represented by the particular N-gram object 232 exists at any location within any word of the relevant language. The N-gram objects 232 and the associated frequency objects 224 are a part of the corpus of the generic word list 208 and are obtained in a fashion similar to the way in which the word object 228 and the associated frequency objects 224 are obtained, although the analysis performed in obtaining the N-gram objects 232 will be slightly different because it will involve analysis of the various character strings within the various words instead of relying primarily on the relative occurrence of a given word.

The present example embodiment, with its example language being the English language, includes twenty-six 1-gram N-gram objects 232, i.e., one 1-gram object for each of the twenty-six letters in the Latin alphabet (also known as the Roman alphabet) upon which the English language is based, and further includes 676 2-gram N-gram objects 232, i.e., twenty-six squared, representing each two-letter permutation of the twenty-six letters within the Latin alphabet.

The N-gram objects 232 also include a certain quantity of 3-gram N-gram objects 232, primarily those that have a relatively high frequency within the relevant language. In the present example embodiment, the portable electronic device 100 includes fewer than all of the three-letter permutations of the twenty-six letters of the Latin alphabet due to considerations of data storage size, and also because the 2-gram N-gram objects 232 can already provide a meaningful amount of information regarding the relevant language. As will be set forth in greater detail in the above-noted U.S. Patents, the N-gram objects 232 and their associated frequency objects 224 provide frequency data that can be attributed to character strings for which a corresponding word object 228 cannot be identified or has not been identified, and typically is employed as a fallback data source, although this need not be exclusively the case.

In the present example embodiment, the language objects 220 and the frequency objects 224 are maintained substantially inviolate in the generic word list 208, meaning that the basic language corpus remains substantially unaltered within the generic word list 208, and the learning functions that are provided by the portable electronic device 100 and that are described in the above-noted U.S. Patents operate in conjunction with other objects that are generally stored elsewhere in memory 110 such as, for example, in the new words database 212 and the frequency learning database 216.

The new words database 212 and the frequency learning database 216 store additional word objects 228 and associated frequency objects 224 in order to provide to a user a customized experience in which words and the like that are used relatively more frequently by a user will be associated with relatively higher frequency values than might otherwise be reflected in the generic word list 208. More particularly, the new words database 212 includes word objects 228 that are user-defined and that generally are not found among the word objects 228 of the generic word list 208. Each word object 228 in the new words database 212 has associated therewith an associated frequency object 224 that is also stored in the new words database 212. The frequency learning database 216 stores word objects 228 and associated frequency objects 224 that are indicative of relatively more frequent usage of such words by a user than would be reflected in the generic word list 208. As such, the new words database 212 and the frequency learning database 216 provide two learning functions, that is, they together provide the ability to learn new words as well the ability to learn altered frequency values for known words.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for receiving input on an electronic device, comprising:
    detecting audible sound generated by strokes of an at least one character written on a writing surface;
    identifying from the detected sound a stroke sequence comprising at least one stroke and a predefined sound signature defining either a straight stroke or a curved stroke or both;
    determining the at least one character written on the writing surface using a predetermined character mapping that associates a particular character of the at least one character written on the writing surface with a particular stroke sequence, wherein the predetermined character mapping identifies the particular character by determining whether the particular stroke sequence includes either the straight stroke or the curved stroke or both, and by counting the number of straight strokes and curved strokes in the particular stroke sequence;
    distinguishing characters having the same stroke sequence resulting from the character mapping by recognizing a direction of each stroke relative to one another using a pad having a textured surface having at least two textured patterns oriented in different directions; and
    outputting a string comprising the at least one character determined by the predetermined character mapping.

2. The method of claim 1, further comprising:
    detecting an ambiguous input when a number of characters match a particular stroke sequence;
    generating an output set comprising a number of strings corresponding with the ambiguous input, each string in the output set including a particular character of the number of matching characters for the particular stroke sequence, the number of strings defining each permutation of the number of characters matching the particular stroke sequence for each ambiguous input; and
    outputting an output including at least a portion of the number of strings of the output set.

3. The method of claim 2, wherein each string in the output set further includes all characters which uniquely match the particular stroke sequence.

4. The method of claim 2, further comprising:
detecting delimiter input separating input sequences, wherein the output set corresponding with the ambiguous input is newly generated for input sequence.

5. The method of claim 2, further comprising:
determining a frequency object associated with each string in the output set, the frequency object having a frequency value defining a frequency of use of the respective string;
wherein the at least a portion of the number of strings of the output set which is output is a particular string having a highest frequency value.

6. The method of claim 2, further comprising:
determining a frequency object associated with each string in the output set, the frequency object having a frequency value defining a frequency of use of the respective string;
wherein the at least a portion of the number of strings of the output set which is output is sorted according to the frequency values associated therewith in descending order of frequency value.

7. The method of claim 2, further comprising:
detecting taps;
selecting a string from the portion of the number of strings of the output set which are output in accordance with a number of taps detected within a predetermined duration, wherein the selected string has a position in the portion of the strings of the output set which is output which corresponds to the number of taps; and
outputting the selected string.

8. The method of claim 1, further comprising:
identifying each straight stroke as a short straight stroke or a long straight stroke in accordance with the duration of the detected stroke;
wherein the straight stroke is a short straight stroke when the duration is less than a first predetermined threshold, and wherein the straight stroke is a long straight stroke when the duration is greater than or equal to the first predetermined threshold.

9. The method of claim 1, further comprising:
determining a duration between a previous stroke and a current stroke, wherein the previous stroke and the current stroke are part of a common stroke sequence when the duration is less than a second predetermined threshold, and wherein the previous stroke and the current stroke belong to separate stroke sequences when the duration is greater than or equal to the second predetermined threshold.

10. The method of claim 1, further comprising:
detecting taps;
selecting a string from the portion of the number of strings of the output set which are output in accordance with a number of taps detected within a predetermined duration, wherein the selected string has a position in the portion of the strings of the output set which is output which corresponds to the number of taps; and
outputting the selected string.

11. The method of claim 1, further comprising:
detecting an ambiguous input when a number of characters match a particular stroke sequence;
determining a most probable character based on a previously inputted stroke sequence defining a previously inputted character when an ambiguous input is detected.

12. The method of claim 11, wherein the most probable character has a higher frequency value compared to each of the number of characters.

13. The method of claim 1, wherein the audible sound is generated by strokes performed on a textured surface.

14. The method of claim 13, wherein the textured surface defines different textured patterns in at least two different directions, wherein the audible sound is different when a stroke is performed on the textured surface in each of the at least two different directions.

15. An electronic device, comprising:
a processor;
a microphone coupled to the processor;
wherein the processor is configured for:
detecting, using the microphone, audible sound generated by strokes of at least one character written on a writing surface;
identifying from the detected sound a stroke sequence comprising at least one stroke and a predefined sound signature defining either a straight stroke or a curved stroke or both;
determining the at least one character written on the writing surface using a predetermined character mapping that associates a particular character of the at least one character written on the writing surface with a particular stroke sequence, wherein the predetermined character mapping identifies the particular character by determining whether the particular stroke sequence includes either the straight stroke or the curved stroke or both, and by counting the number of straight strokes and curved strokes in the particular stroke sequence;
distinguishing characters having the same stroke sequence resulting from the character mapping by recognizing a direction of each stroke relative to one another using a pad having a textured surface having at least two textured patterns oriented in different directions; and
outputting a string comprising the at least one character determined by the predetermined character mapping.

16. The device of claim 15, wherein the writing surface is a textured surface on an exterior of a housing of the electronic device, or the writing surface is a textured pad exposed by the housing of the electronic device.

17. The device of claim 16, wherein the textured surface defines a different textured pattern in at least two directions so as to create different audible sounds when a particular stroke is performed on the textured surface in each of the at least two directions.

18. The device of claim 15, wherein the writing surface is a textured pad external to the electronic device, the textured pad having a texture surfaced which provides the writing surface.

19. The device of claim 18, wherein the microphone is an external microphone connected to the electronic device for transmitting acoustic signals detected by the microphone to the processor, the microphone being located in the textured pad.

20. The device of claim 15, wherein the microphone is an external microphone connected to the electronic device for transmitting acoustic signals detected by the microphone to the processor.

21. The device of claim 20, wherein the external microphone is located towards a tip of a stylus, the stylus being connected to the electronic device for transmitting acoustic signals detected by the microphone to the processor.

22. A system comprising:
a texturized pad, comprising:
a pad having a rough textured surface having at least two rough textured patterns, wherein each pattern is oriented in a different direction;
a microphone located in the pad;
an electrical connector extending through the pad, the electrical connector being connected to the microphone and having an interface exposed by the pad and configured for a microphone input port; and
a processor configured for:
   detecting, using the microphone, audible sound generated by strokes of at least one character written on a writing surface;
   identifying from the detected sound a stroke sequence comprising at least one stroke and a predefined sound signature defining either a straight stroke or a curved stroke or both;
   determining the at least one character written on the writing surface using a predetermined character mapping that associates a particular character of the at least one character written on the writing surface with a particular stroke sequence, wherein the predetermined character mapping identifies the particular character by determining whether the particular stroke sequence includes either the straight stroke or the curved stroke or both, and by counting the number of straight strokes and curved strokes in the particular stroke sequence;
   distinguishing characters having the same stroke sequence resulting from the character mapping by recognizing a direction of each stroke relative to one another using a pad having a textured surface having at least two textured patterns oriented in different directions; and
   outputting a string comprising the at least one character determined by the predetermined character mapping.

* * * * *